(12) United States Patent
Fuss et al.

(10) Patent No.: US 8,750,708 B2
(45) Date of Patent: Jun. 10, 2014

(54) LAYOUT APPARATUS, RADIO APPARATUS, AND METHOD FOR COMMUNICATING IN AN AIRPLANE

(75) Inventors: Tim Fuss, Hamburg (DE); Daniel Glaser, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 505 days.

(21) Appl. No.: 12/823,830

(22) Filed: Jun. 25, 2010

(65) Prior Publication Data

US 2011/0188862 A1    Aug. 4, 2011

Related U.S. Application Data

(60) Provisional application No. 61/220,340, filed on Jun. 25, 2009.

(30) Foreign Application Priority Data

Jun. 25, 2009  (DE) .......................... 10 2009 030 507

(51) Int. Cl.
  *H04B 10/00*  (2013.01)
  *H04J 3/00*  (2006.01)
  *H04J 14/00*  (2006.01)

(52) U.S. Cl.
  USPC .......... 398/115; 398/67; 455/561; 455/422.1; 455/575.5; 340/426.35; 340/10.1

(58) Field of Classification Search
  CPC .................. H04B 10/25752; H04B 10/25758; H04B 10/1143; H04J 14/0298
  USPC .................................................. 398/115, 67
  See application file for complete search history.

(56) References Cited

U.S. PATENT DOCUMENTS

| 6,173,230 | B1 * | 1/2001 | Camus et al. ................. 701/120 |
| 2007/0001809 | A1 * | 1/2007 | Kodukula et al. ............ 340/10.1 |
| 2007/0286599 | A1 * | 12/2007 | Sauer et al. ..................... 398/28 |
| 2010/0014868 | A1 * | 1/2010 | McGlynn et al. ............. 398/115 |
| 2010/0189439 | A1 * | 7/2010 | Novak et al. .................... 398/67 |

FOREIGN PATENT DOCUMENTS

| DE | 197 38 254 A1 | 4/1999 |
| DE | 197 48 899 A1 | 12/1999 |
| WO | 2004047373 A2 | 6/2004 |

OTHER PUBLICATIONS

Summons of a Hearing for German Application No. 10 2009 030 507.6-35 mailed Aug. 2, 2010.
German Office Action for Application No. 10 2009 030 507.6-35 mailed Jan. 28, 2010.

* cited by examiner

*Primary Examiner* — Oommen Jacob
(74) *Attorney, Agent, or Firm* — Ingrassia Fisher & Lorenz P.C.

(57) ABSTRACT

A layout apparatus for communicating includes, but is not limited to, a structural device, a first signal adjustment device and a radio device. The structural device is designed for configuring the layout of a room, and the first signal adjustment device is adapted for the electrical-optical conversion of an antenna signal. Furthermore, the first signal adjustment device and the radio device are arranged in the structural device, and the radio device is connected to the first signal adjustment device in such a manner that the antenna signal can be transmitted and/or received as a radio signal.

10 Claims, 7 Drawing Sheets

LAYOUT APPARATUS, RADIO APPARATUS, AND METHOD FOR COMMUNICATING IN AN AIRPLANE

CROSS-REFERENCE TO RELATED APPLICATIONS

This application claims the benefit of the filing date of German Patent Application No. 10 2009 030 507.6 filed Jun. 25, 2009, the disclosure of which is hereby incorporated herein by reference, and of U.S. Provisional Patent Application No. 61/220,340, filed Jun. 25, 2009, the disclosure of which is hereby incorporated by reference.

TECHNICAL FIELD

The present invention relates to the technical field of communication technology, and in particular the present invention relates to communication in an airplane. Furthermore, the present invention relates to a layout apparatus for communicating, a method for communicating by means of a layout apparatus, a radio apparatus, a method for transmitting an antenna signal, a communication system, a computer-readable storage medium, an airplane and a signal adjustment device.

BACKGROUND

In airplane cabins, antennae may be connected to the transmit systems and receive systems by means of coaxial cables. The use of coaxial cables or coaxial transmission systems may require the routing of coaxial cables in the interior of the airplane in order to convey an antenna signal from the transmit system to the antenna. The antenna may be installed at a location remote from the transmit system in order to provide good transmit prerequisites. The antenna can, for example, be arranged outside a wall so that the signals emitted by the antenna may not be blocked by the wall.

Due to their electrical characteristics, coaxial cables may be designed in a multilayer design or multi-ply design. In particular, for example for separating an interior conductor from an exterior conductor, dielectric materials may be used in coaxial cables. However, the dielectric materials may comprise a high density value. Consequently, even in small configurations high weights of the coaxial cables or bundles of coaxial cables that are used may result. In this arrangement the coaxial line systems may make a substantial contribution to the total weight of an airplane.

There may thus be a need to create more lightweight transmission systems. In addition, other needs, desirable features, and characteristics will become apparent from the subsequent detailed description, and the appended claims, taken in conjunction with the accompanying drawings and this background.

SUMMARY

A layout apparatus for communicating, a method for communicating by means of a layout apparatus, a radio apparatus, a method for transmitting an antenna signal, a communication system, a computer-readable storage medium, an airplane and a signal adjustment device may be described.

According to an exemplary embodiment of the present invention, a layout apparatus may be provided that can be used for communication, and in particular for wireless communication. The layout apparatus may comprise a structural device, a first signal adjustment device or conversion device, and a radio device.

The structural device may be adapted for configuring a room or a space or for configuring a room or interior space, in particular for organising the layout of an airplane cabin or of the interior space of an airplane. The structural device may be adapted for organising or configuring the layout of a space or of an interior space or the structural device may be adapted for forming the layout of a room. The first signal adjustment device may be equipped for the electrical-optical conversion of an antenna signal. In other words, an already modulated electrical signal that may be prepared for emission by way of a radio device may be converted to a corresponding optical signal. In the opposite direction an optical signal may be converted to a modulated electrical signal. The electrical signal may comprise a predeterminable frequency.

The signal adjustment device and the radio device may be arranged in and/or on the structural device. The structural device may determine the shape of the space or interior space. For example, the structural device may be a furnishing and/or equipment component for an airplane. A structural device may be the interior equipment of an airplane cabin. The structural device may physically divide the airplane cabin into regions, or it may be a lining for construction elements such as fuselage components.

The radio device may be arranged at predeterminable positions of the structural device. Thus, in one example the radio device may be arranged on a surface of the structural device. In a further example the radio device may be arranged in the structural device near a first signal adjustment device. For example the radio device and the signal adjustment device may be arranged inside the structural device. The signal adjustment device and the radio device may be arranged in the structural device and can, for example, be fully or at least partly covered by the structural device.

The radio device can be connected to the first signal adjustment device in such a manner that an antenna signal can be transmitted and/or received as a radio signal. In other words, the first signal adjustment device may be adapted in such a manner that it operates in any direction of signal propagation. The first signal adjustment device may be usable both in the direction of transmitting and in the direction of receiving.

In a first direction the first signal adjustment device may convert an optical signal to an electrical signal, wherein the content of the electrical signal may essentially correspond to the content of the antenna signal that may have been provided by the radio device.

In a second direction the first signal adjustment device may convert an electrical signal to an optical signal wherein the content of the optical signal may essentially correspond to the content of the electrical signal.

Generally speaking, a space or a room may constitute a spatial region around the structural device. Apart from the interior space of an airplane or the interior space of the passenger cabin, by means of a radio device it may also be possible to supply an exterior space. In one example, in the case of maintenance work it may also be possible, by means of a radio device and in particular with the layout apparatus, to supply zones or spaces outside an airplane. For the purpose of providing an external supply the radio device, such as an antenna, can, for example, be installed or arranged in an aerofoil. Therefore, in one example an aerofoil can also be a layout apparatus.

According to a further exemplary embodiment of the present invention, a method for communicating by means of a layout apparatus may be described, wherein the method may first comprise converting an antenna signal between an electrical and an optical quantity by means of a first signal adjustment device. The electrical quantity may be a current intensity, a voltage or an electromagnetic field intensity, or in each case a temporal sequence thereof. The optical quantity can be a quantity of light or a temporal sequence thereof.

Both during electrical-optical conversion and during optical-electrical conversion, conversion may take place in such a manner that a predeterminable value or value range of the electrical quantity of an antenna signal is converted to an optical value or value range that corresponds to the signal, and vice versa. For example, an analogue electrical signal may thus be converted to an analogue optical signal.

Furthermore, the method for communicating may comprise transmitting and/or receiving the antenna signal as a radio signal by means of a radio device, wherein the first signal adjustment device may be arranged in a structural device of the layout apparatus. The structural device may be adapted for configuring a room or space or for configuring an interior of a room or of a space and may also have a predeterminable exterior shape in order to lend a certain shape or layout to a space or interior space. The structural device may be a modular layout element such as a ceiling panel or a partition wall. In an example the exterior shape of the structural device may be adapted to determine the shape or layout of a room.

According to yet another exemplary embodiment of the present invention, a radio apparatus may be stated, wherein the radio apparatus may comprise a radio system device and a second signal adjustment device. For example, the first signal adjustment device and the second signal adjustment device may be the same type of signal adjustment devices. The first signal adjustment device and the second signal adjustment device may be implemented together on a module and may be switchable by means of a switch. A radio apparatus may also be denoted radio system apparatus.

The radio system device may be adapted for generating and/or receiving an antenna signal. In particular, the radio system device may be adapted for modulating and/or demodulating a signal.

During modulating respectively demodulating of the radio system device, an LF (Low-Frequency) signal may be converted to an HF (High-Frequency) signal or antenna signal, respectively vice-versa.

The radio apparatus may thus be used as a signal source and/or as a signal sink, in other words for generating or receiving an antenna signal. The radio system device may provide or process a modulated antenna signal at the frequency predetermined for the radio system device. Thus, for example, a WLAN (Wireless Local Area Network) radio system device may provide or process an antenna signal in the ISM (Industrial, Scientific and Medical) band.

The second signal adjustment device may be adapted for the electrical-optical conversion of an antenna signal of the radio system device. In this arrangement it may again be possible to convert between an electrical quantity and an optical quantity, in other words for example between a field intensity and a light current.

According to yet another exemplary embodiment, a method for transmitting an antenna signal may be described, wherein the method may comprise generating and/or receiving an antenna signal. The method may thus describe generating and receiving, in separate steps or in separate devices, as well as in common devices or shared devices. By means of a second signal adjustment device, the antenna signal may be converted between an electrical quantity and an optical quantity. Whether the antenna signal may be generated or received may depend on a direction of transmitting respectively a direction of receiving of the transmit or receive signal. Devices that are able to both transmit and receive may be referred to transceivers.

According to another exemplary embodiment of the present invention, a communication system may be created in which a radio system apparatus according to the invention and a layout apparatus according to the invention may be interconnected via an on-board optical waveguide system, an on-board beam waveguide system or an on-board glass-fibre system. An on-board optical waveguide system may be an optical waveguide system that may be installed on board an airplane.

According to yet another exemplary embodiment of the present invention, a computer-readable storage medium may be described in which a program code may be stored which, when it may be executed on a processor, may execute at least one from the method for communicating by means of a layout apparatus and/or the method for transmitting.

A computer-readable storage medium may be a floppy disk, a hard disk, a USB (Universal Serial Bus) storage medium, a RAM (Random Access Memory), a ROM (Read Only Memory) or an EPROM. However, a computer-readable storage medium may also be a network, for example the internet, via which network data can be retrieved.

According to another exemplary embodiment of the present invention, a program element may be stated which, when it may be executed on a processor, may execute at least one from the method for communicating by means of a layout apparatus and/or the method for transmitting.

According to yet another exemplary embodiment of the present invention, an airplane may be provided that may comprise at least one layout apparatus, at least one radio apparatus and/or at least one communication system according to one of the above-mentioned exemplary embodiments.

According to a further exemplary embodiment of the present invention, a signal adjustment device, in particular a transceiver, for the electrical-optical conversion of an antenna signal may be provided, wherein the signal adjustment device may be adapted for converting an antenna signal between an analogue electrical quantity and an analogue optical quantity corresponding to the antenna signal.

A structural device, such as an interior lining or a ceiling panel, may be used to cover constructional elements of a fuselage or airplane fuselage. Large numbers of ceiling panels may thus be installed in the interior of an airplane. Furthermore, other monuments, for example built-in toilets or built-in galleys, may form a room with corresponding walls and in particular with corresponding surfaces. Due to their planar shape, the surfaces, which may be created by structural devices, may allow the emission of electromagnetic waves. In other words, a planar radio device may easily be able to be integrated in a planar structure.

Radio devices, for example antenna, can be installed on the surfaces of structural devices; however, in this arrangement they may be recognisable as add-on components. Integration in a structural device or installation of the radio device in a surface of the structural device may make it possible to cover the components that may be used for wireless communication. Consequently, a layout apparatus with an integrated signal adjustment device and/or with an integrated radio device may essentially not differ externally from a layout apparatus without radio integration.

Furthermore, by installing a structural device with an integrated radio device within the room or space, at the same time the radio device may also be installed at a predeterminable position within the room. After installation of the layout apparatus, radio communication by way of the radio device may be possible.

Due to the lighter weight of optical wave cables, fibre-optic cables or optical waveguides, the transition between electrical and optical signals by means of electrical-optical converters may result in a reduction in the weight of a cable system or cable harness. When designing the interior of an airplane the radio device may be able to be placed at predefinable locations. I.e. in the layout of the interior of an airplane the radio device may be able to be placed at predefinable locations. For example, ceiling panels with radio devices can be constructed in such a manner that the radio device may be arranged at a predetermined position of the ceiling panel.

Furthermore, with the use of a single optical waveguide or glass fibre, several signals may be able to be multiply-used at the same time, for example by wavelength-dependent multiplexing or WDM (Wave Division Multiplexing), and thus correspondingly contribute to the reduction in weight.

A radio device may be usable in a broad frequency range. Therefore the structural device, for example the ceiling panel, may be usable with different radio transmission systems of various types. In other words, transmission of the optical antenna signal by way of the optical waveguides may be transparent. Thus, in the planning phase of airplanes it may be provided for the provision of radio devices for illuminating particular regions within an airplane. A layout apparatus may provide not only a single signal adjustment device or a single radio device, but instead also a plurality of radio devices.

According to another exemplary embodiment of the present invention, the layout apparatus may comprise a radio device that may be selected from a group of radio devices, wherein the group may consist of an antenna, an antenna array, a stripline, a stripline conductor, an electronic antenna and/or a broadband antenna.

According to another exemplary embodiment of the present invention, the structural device may be a structural device that may be selected from a group of structural devices, wherein the group of structural devices may consist of a ceiling plate, a ceiling panel, an interior lining, an interior lining for an airplane, a fuselage structure, for example a frame, a rib or a carrier, and a monument, for example a galley and a toilet.

According to yet another exemplary embodiment of the present invention, the signal adjustment device may be exchangeable. An exchangeable signal adjustment device may provide a structural device of a modular design, wherein the radio-technology-related functionality of the structural device may be determined by the first signal adjustment device that is used. By exchanging the first signal adjustment device or a corresponding electronic module in which the functionality of the signal adjustment device may be implemented, the behaviour of the layout apparatus may be able to be determined A modular design of a structural device may be made possible.

By exchanging the signal adjustment device, a structural device, for example a ceiling panel, can be prepared for corresponding functional use. It is thus possible to create a structural device that comprises a WLAN (Wireless LAN) functionality or a WiMAX™ (Worldwide Interoperability for Microwave Access) functionality. In other words, by exchanging the signal adjustment device, the functionality of the layout apparatus may be adaptable to the respective communication requirements of the passengers in different regions of the passenger cabin without this altering the structural device and thus the layout of the room.

Consequently the layout apparatuses may be able to be produced in a simple manner because in the production and in the design of the layout apparatus it may not be necessary to take into account the subsequent functional use. Furthermore, by a simple change of the first signal adjustment device another radio technology, or even a new radio technology, may be able to be used without there being a need to exchange the respective structural device or the respective ceiling panel. The first signal adjustment device or the electronic module for adjustment to the antenna may be accommodated in a recess of the structural device. Furthermore, the signal adjustment device may be designed as a plug-in module.

According to yet another exemplary embodiment of the present invention, the layout apparatus may comprise an energy supply device, wherein the energy supply device may be adapted for optically supplying the first signal adjustment device with energy.

In other words the energy supply device may obtain energy or power from a signal that is optically conveyed to the energy supply device. The energy obtained may be able to be supplied to the other components of the layout apparatus, for example to the signal adjustment device.

According to yet another exemplary embodiment of the present invention, the layout apparatus may comprise an optical separating device and/or an optical combining device, wherein the optical separating device may be adapted for separating at least two optical signals. The optical combining device may be adapted for combining at least two optical signals on a glass fibre. In particular, the separating device and/or the combining device may be adapted for decoupling or coupling out or extract an optical power signal or an energy signal from a line, respectively the device may be adapted for impressing it on a line or coupling it in a line, on which line a useful optical signal or optical payload signal may be transmitted in parallel. Furthermore, the combining device may be adapted to impress a useful signal on a line on which an optical power signal may already be transmitted. The optical separating device may be adapted for coupling at least one signal out from a line.

Separation of the optical signals may, for example, take place by means of semi-transparent mirrors. Thus light signals of different frequencies may be able to be transmitted on a common or shared optical conductor and waveguide, respectively. For example, the energy supply device may be able to be supplied with light of a wavelength that differs from the wavelength of the light that may be destined for the first signal adjustment device. The term "common" or "shared" may mean "using the same medium at the same time".

According to yet another exemplary embodiment of the present invention, the layout apparatus may, furthermore, comprise a connecting device or plug-in device or a connector and/or a socket, wherein the connecting device may be adapted for connecting the first signal adjustment device to the radio device. In the structural device a corresponding connecting device may be provided.

Thus the signal adjustment device may be implemented as a module that may be connectable to the connecting device in a pluggable manner. In a plugged-in state the connecting device may hold the signal adjustment device to the structural device in such a manner that the signal adjustment device can essentially not slide from the connecting device as a result of vibration. It is then possible to substantially do without a guide rail for attaching the signal adjustment device. For example, on a side that faces away from the interior, interior room or the passenger compartment, the signal adjustment device can be installable on a surface of the structural device in such a manner that the signal adjustment device may essentially not be visible from the interior room. The connecting device may be a coaxial socket or a coaxial jack.

On the structural device, in particular on the ceiling panel, essentially only one connecting device may be installed that can be used as an antenna connection. In an example a single connecting device may be installed on the structural device. In one example, apart from the one connecting device at least one further connecting device may be implemented. The connecting device can be an RF interface, for example, an SMA.

On the signal adjustment device or on the electronics module an optical conductor connection, an optical waveguide connection or a beam waveguide connection can be present. When the signal adjustment device is arranged on the surface of the structural device, a plugged-in optical conductor in the signal adjustment device may provide additional support and hold, respectively. To this effect the optical conductor may be attached to the structural device.

According to yet another exemplary embodiment of the present invention, the layout apparatus may, furthermore, comprise a connecting device, a passage, an opening, a plug-in device or a connector and/or a socket, wherein the adjustment device may be adapted for connecting the first signal adjustment device with a waveguide or with an optical conductor. In the structural device a corresponding connecting device for the optical conductor may be provided.

In one example the structural device may comprise a passage or an opening for an-optical conductor. In another example a connection, a terminal or a connector or a socket may be provided on the structural device, to which connection terminal, connector or socket the optical conductor may be connected. By means of internal interconnections or wiring in the structural device, a connection between the connection and the signal adjustment device may be able to be established.

According to yet another exemplary embodiment of the present invention, the first signal adjustment device may be adapted for the conversion of an analogue antenna signal.

Processing an analogue signal may make it possible for mapping between electrical quantities and/or optical quantities to be achieved with high accuracy. By using of analogue technology or of an analogue antenna signal, it may be possible to substantially do without digitalisation. With a view to the reliability of a system used in an airplane the use of analogue technology can provide improved safety.

Both the first signal adjustment device and the second signal adjustment device may convert an antenna signal between an electrical signal and an optical signal. Both the electrical signal and the optical signal may be an analogue signal. The conversion by means of the signal adjustment device may therefore be an analogue conversion.

According to a further exemplary embodiment of the present invention, the radio system device may be selected from the group of radio system devices consisting of a mobile radio system device, e.g. a GSM-system device, a WLAN radio system device, a mobile-radio-interferer radio system device, for example a GSM-on-board-interferer radio system device, a DVB-T radio system device, and a DMB radio system device. The mobile radio interferer can also be an interferer for UMTS and/or LTE.

It should be mentioned that different aspects of the invention were described with reference to different subject matters. In particular, some aspects were described with reference to device-type claims, whereas other aspects were described with reference to method-type claims. However, a person skilled in the art can gather from the above description and from the following description that, unless otherwise described, in addition to any combination of characteristics associated with a category of subject matters, any other combination of characteristics is also considered to have been disclosed by this text, which combination relates to different categories of subject matters. In particular, combinations of characteristics of device-type claims and characteristics of method-type claims are deemed to have been disclosed.

This and other aspects of the present invention may be further illustrated with reference to the exemplary embodiments that may be described below. Below, exemplary embodiments of the present invention are illustrated with reference to the figures.

BRIEF DESCRIPTION OF THE DRAWINGS

The present invention will hereinafter be described in conjunction with the following drawing figures.

DETAILED DESCRIPTION

Figure 1:
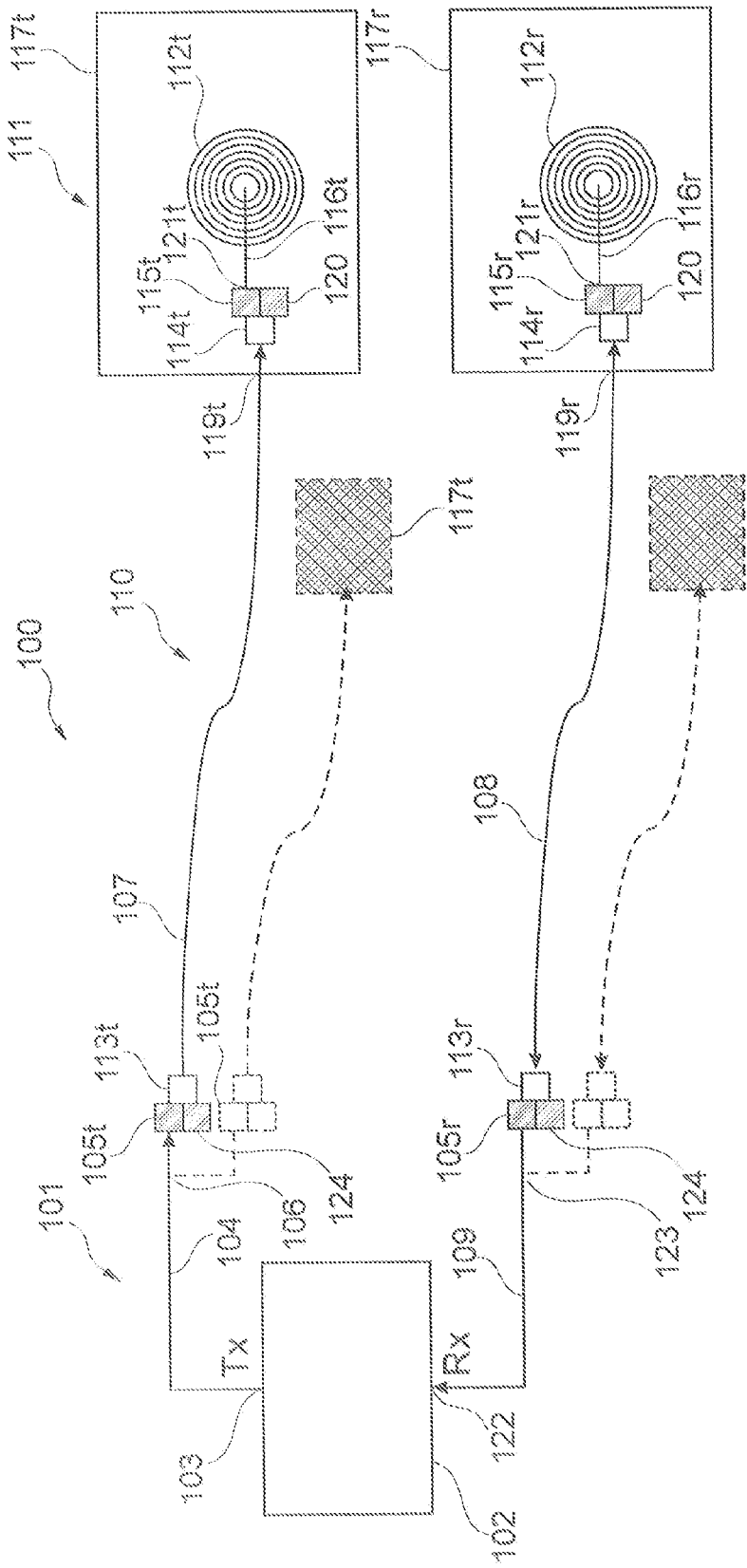
FIG. 1 shows a block diagram of a communication system according to an exemplary embodiment of the present invention.

The following detailed description of the invention is merely exemplary in nature and is not intended to limit the invention or the application and uses of the invention. Furthermore, there is no intention to be bound by any theory presented in the preceding background of the invention or the following detailed description of the invention.

The illustrations in the figures are diagrammatic and not to scale. In the following description of the figures the same reference characters are used for identical or corresponding elements. Moreover, the following detailed description of the invention is merely exemplary in nature and is not intended to limit the invention or the application and uses of the invention. Furthermore, there is no intention to be bound by any theory presented in the preceding background of the invention or the following detailed description of the invention.

FIG. 1 shows a block diagram of a communication system 100 according to an exemplary embodiment of the present invention.

The communication system 100 is essentially divided into three functional sections. The radio system apparatus 101 is used for processing or preparing the antenna signals. The transmission device 110 is used for distributing optical signals in the airplane, and the layout apparatus 111 is used for sending and receiving antenna signals at certain predeterminable locations within the airplane.

The radio system device 102 or the RF (Radio Frequency) system X 102 generates a modulated antenna signal and can also process a modulated antenna signal. The radio system device can be any system, which is the reason why the designation RF System X has been selected, wherein 'X' denotes any radio technology, for example WLAN, GSM or DVB-T. The radio system device can provide the transmission signal Tx or the prepared antenna signal Tx at the output 103. The transmission signal Tx is already an antenna signal Tx mixed onto the transmission frequency.

An antenna signal may denote a signal which as such only needs to be provided to one antenna in order to transmit the signal by radio. In other words, in the output signal Tx the information that is to be transmitted to a terminal or end device has already been converted to the protocol supported by the radio system device 102. Thus in a WLAN (Wireless LAN) system the signal at the output 103 can be a transmission signal Tx that has been mixed into the WLAN frequency band or the ISM frequency band. The transmission signal Tx or the antenna signal Tx itself is in this example determined by the WLAN protocol. The antenna signal Tx is a high-frequency signal that can already be transmitted by way of an antenna as it is. Thus the antenna signed Tx can be transmitted in its present form.

The output signal Tx at the output 103 may be available in electrical form as an electrical signal. Therefore the output signal Tx can be conveyed, by way of the coaxial line 104, to the second signal adjustment device 105t. The transmit signal Tx can also be copied by means of a Y-element 106 to a plurality of output signals Tx, and can be made available to a plurality of signal adjustment devices 105t and in this way to a plurality of first signal adjustment devices 115t.

A signal adjustment device can essentially be adapted as a transmit-signal adjustment device only for receiving an electrical signal and for transmitting an optical signal.

As a receive-signal adjustment device the signal adjustment device can essentially be adapted only for receiving an optical signal and for providing the corresponding electrical signal.

Transmission between the radio system device 102 and the second signal adjustment device 105t may be made by means of a coaxial cable 104. The second signal adjustment device 105t may also be referred to as a HF (High-Frequency) optical modulator. The second signal adjustment device 105t is adapted in such a manner that, when an electrical signal 104 or a high-frequency signal 104 is made available to the second signal adjustment device 105t, the second signal adjustment device 105t converts the electrical signal 104 to an optical signal that can be transmitted on the glass fibre 107, on the optical conductor 107 or on the optical waveguide 107.

On the receive side 105r for the received antenna signal Rx an antenna signal can be received in the second signal adjustment device 105r by way of the optical waveguide 108. The second signal adjustment device 105r may also be referred to as an optical high-frequency demodulator (HF-demodulator). In the optical HF-demodulator 105r the optical antenna signal can be converted to an electrical antenna signal Rx, which can be transmitted to the radio system device 102 by the second signal adjustment device 105r by means of the coaxial cable 109.

Via parallel branches antenna signals or receive signals Rx from different sources can be combined by means of a Y-element 123 and can be transmitted to the radio system device 102. On the transmission route 110, signal doubling can be carried out in order to obtain additional cover regions or footprints in that several layout apparatuses are used for radio communication. With the use of several layout apparatuses it becomes possible to operate at weaker signal intensities.

The optical transmission device 110 or the on-board optical waveguide system 110 can be used for optical signal transmission within the airplane. The lightweight nature of optical waveguides 107, 108 can reduce the weight of a communication infrastructure within an airplane.

The layout apparatus 111 comprises the radio device 112t and/or the radio device 112r. The radio devices can be adapted or implemented as a transmit radio device 112t, as a receive radio device 112r or as a transmit/receive radio device 112t, 112r (transceiver radio device). The transmit radio device may permit only the transmitting of signals. The receive radio device may permit only the receiving of signals, and the transmit/receive radio device 112t, 112r or transceiver radio device may permit both transmitting and receiving. The selection of the function can be determined by means of the installation of a corresponding first signal adjustment device 115t, 115r or of a corresponding module.

The transmit signal Tx that has been converted to an optical signal is forwarded by the second signal adjustment device 105t, by way of an optical combiner 113t, an optical combining device 113t or an optical combiner 113t, by way of the optical waveguide 107, to the optical splitter 114t or to the optical separating device 114t. Instead of by way of an optical combiner, the transmit signal Tx can also be conveyed directly to the optical waveguide 107. And instead of by way of the optical splitter 114t, the optical waveguide 107 can also be connected directly to the first signal adjustment device 115t or to the optical HF-demodulator 115t on the antenna side 111. The optical signals, both the useful signals and the power signals, can also be guided in separate lines.

The description of the connections and of the other characteristics of the first signal adjustment device correspondingly applies to the separating device and the combining device, respectively. Accordingly, if the separating device and the combining device, respectively is left out or is not used, the description of the separating device respectively of the combining device accordingly also applies to the first signal adjustment device or accordingly also to the second signal adjustment device.

By way of the coaxial line 116t, the first signal adjustment device 115t is connected to the radio device 112t. The first signal adjustment device 115t as well as the coaxial cable 116t and the radio device 112t or antenna 112t are integrated in the structural device 117t. The structural device 117t can, for example, be a ceiling panel.

FIG. 1 shows a receive system for an antenna signal as a separate structural device 117r or as a structural receiving device. The radio device 112r or the receiving antenna 112r is connected to the first signal adjustment device 115r by way of the coaxial cable 116r. The first signal adjustment device 115r, can be adapted as an electrical-optical converter 115r. The structural device 117r can, for example, be a ceiling panel.

In other words, in a direction of transmitting, the first signal adjustment device 115t, 115r can be adapted as a converter of an optical signal to an electrical signal. In a receive device 117r the first signal adjustment device 115r can be used as a converter of electrical signals 116r to optical signals 108. By means of a modular design of the first signal adjustment device 115t, 115r the respective structural device 117t, 117r can be used either as a structural transmitting device or as a structural receiving device. The structural device 117*t*, 117*r* comprises the connections 119*t* and 119*r*. The connections 119*t*, 119*r* are used to connect the first signal adjustment device 115*t*, 115*r* to the optical waveguide 107, 108.

By means of the RF-system 102 or the radio system device 102 or by a plurality of radio system devices 102 a plurality of layout apparatuses 111 and the radio devices 112*t*, 112*r* contained therein can be driven or controlled.

The modular design or the modular construction of the first signal adjustment device 115*t*, 115*r* and a correspondingly modular design of the second signal adjustment device 105*t*, 105*r* make it possible, by a simple exchange of the first signal adjustment device 115*t*, 115*r* or of the second signal adjustment device 105*t*, 105*r*, to determine the direction of transmitting. Correspondingly, the combining device and/or the separating device 113*t*, 113*r*, 114*t*, 114*r* can be of a modular design. Furthermore, the modular design makes it possible to determine the type of radio transmission, for example WLAN or GSM. To this effect the first signal adjustment device 115*t*, 115*r* and the second signal adjustment device 105*t*, 105*r* are matched to each other and are of the same type of radio transmission.

It is also imaginable for both the transmitting antenna 112*t* and the receiving antenna 112*r*, as well as the corresponding first signal adjustment devices 115*t*, 115*r*, to be implemented on the same structural device 117*t*, 117*r*, thus forming a transceiver.

As shown in the following considerations, with the use of the optical lines 107, 108 it is possible to achieve savings in weight when compared to the use of a purely coaxial cable system. By means of the first signal adjustment device 115*t*, 115*r* and the second signal adjustment device 105*t*, 105*r*, in a manner of speaking at least part of a coaxial connection 104, 116*t*, 116*r*, 109 can be replaced by an optical transmission infrastructure. In this arrangement the replaced part of the coaxial transmission infrastructure can account for a large part of the transmission infrastructure.

Depending on their design, optical conductors, fibre-optic conductors or optical conductor cables may be lighter in weight by more than a factor of 25 than coaxial cables. The weight per fibre may be still further reduced in the case of larger bundles. However, in an airplane, for example, essentially bundles with a maximum specifiable number of optical conductors may be used, because very large bundles may often be able to be handled or processed and repaired only with great effort or expense. For this reason bundles of a medium bundle size may be used. A bundle may, for example, comprise up to a maximum of 12 optical conductors and may, furthermore, be industrially handable and repairable. The bundle thickness can depend on the tensile-load resistance of a cable or a fibre. Fibre-optic conductors or optical waveguides can be very thin fibres, for example approximately 0.1 mm. In the formation of a bundle, sheathing of an optical conductor is exchanged for fibres or is widened, wherein the loading capacity remains almost the same. Thus the total weight remains almost the same, but the number of fibres increases. Therefore the weight per fibre decreases as the number of fibres in the bundle increases.

The antennae 112*t*, 112*r* also can be designed as lightweight components with a weight less than 0.1 kg. This weight includes the electronics; i.e., for example, the first signal adjustment device 115*t*, 115*r* and the second signal adjustment device 105*t*, 105*r*, and this weight also takes into account the weight of the direction of transmitting as well as the weight of the direction of receiving Tx, Rx. If materials such as GFP (Glass Fibre reinforced Plastic) or GRP (Glass Fibre reinforced Plastic) are used in the structural device, the expected weight of the structural device with the integrated antenna 112*t*, 112*r* is very light.

In other words this means that the output signal that is provided in the communication system 100 by the radio system device 102 or by the device 102 on the interface 103 is converted to optical signals—near the devices 102—and is then conveyed by way of a glass fibre 107 to a single antenna or to a plurality of antennae 112*t*. The device 102 or the radio system device 102 can, for example, be a WLAN-device or a GSM (Global System for Mobile communications) device.

In the antenna 112*t*, in particular in the transmitting antenna 112*t* or in the receiver 115*t* on the antenna side, the output signals or signals of the radio system device 102 are converted back to electrical signals. In particular, the signals or output signals of the radio system device 102 are contained in the light and from the light can be converted back to electrical signals. In other words the light of the optical signal comprises the signals of the radio system device 102. The electrical signals can then be conveyed via the antenna 112*t*, 112*r* depending on the adaption or the design of the layout apparatus 111, and can be emitted by way of the antenna 112*t*. At the time of receiving the optical antenna signal, demodulation takes place, which is correspondingly converse to modulation.

At the receiver antenna 112*r* or at the plurality of receiver antennae 112*r* the receive signal Rx, which is received as an electrical signal, or the electrical energy of the receive signal is converted into optical energy by the optical HF-modulator 115*r* or by the first signal adjustment device 115*r*. The optical energy or the optical signal is present at the output of the first signal adjustment device 115*r*. The optical energy can be conveyed, by way of the optical waveguide 108 or the glass fibre 108, to the second signal adjustment device 105*r* or to the converter 105*r*. The converter 105*r*, the optical HF-demodulator 105*r* or the second signal adjustment device 105*r* is arranged in close proximity to the communication system 102 or in close proximity to the radio system device 102. As a result of the arrangement of the second signal adjustment device 105*t*, 105*r* in close proximity to the radio system device 102 the line length of the coaxial transmit line 104 and of the coaxial receive line 109 can be kept short, and a correspondingly longer piece can be replaced by an optical transmission system.

In the converter 105*r* in close proximity to the communication system 102 the signal received by way of the optical waveguide 108, after conversion to an electrical signal, is conveyed to the radio system 102 or to the radio system device 102.

It may thus be considered to be an aspect of the present invention to connect a radio apparatus to an antenna 112*t*, 112*r* in such a way that as large a section as possible of the transmission infrastructure 110 can be led via a lightweight optical wave cable.

Below, the energy supply of the first signal adjustment devices 115*t*, 115*r* or of the remote converters 115*t*, 115*r* is to be discussed in more detail. The energy supply of the remote converters 115*t*, 115*r* takes place by way of an optical supply. In this arrangement, a photocell 120 or a device that can convert optical energy to electrical energy is connected to the converter module 115*t*, 115*r* or to the first signal adjustment device 115*t*, 115*r*. For example, the energy supply device 120 can be a photocell that is supplied with light and thus with energy by way of the glass fibre 107, 108.

The provision of energy for the energy supply device 120 or photocell 120 takes place by means of the feed device 124. FIG. 1 shows that the optical energy to supply energy to the first signal adjustment device 115*t*, 115*r* is achieved by way of the same optical cable 107, 108 by way of which also the signal distribution is achieved. In other words, the optical energy for supplying energy to the first signal adjustment device is supplied via the same optical cable that is used for distributing the signal.

In an optical system various optical elements can be differentiated.

An optical combiner 113t essentially combines both the light of the power light source 124 and the light of an electrical→optical converter 105t.

An electrical→optical converter 105t is a converter that converts an electrical signal to an optical signal. The arrow→quasi indicates the direction of conversion.

An optical splitter 114t essentially separates the light of the power light source 124 from the light of a converter 105t and conveys the separated light to the photocell 120 and to the optical→electrical converter 115t.

An optical→electrical converter 115t is a converter that converts an optical signal to an electrical signal.

A splitter/combiner 113r conveys, for example, the light of the power light source 124 to the fibre 108, while conveying the light of the electrical→optical converter 115r from the fibre to the optical→electrical converter 105r.

A splitter/combiner 114r can, however, also concentrate the light of the electrical→optical converter 115r to the fibre 108 and can separate the light of the power light source 124 and convey it to the photocell 120.

A splitter/combiner 113r, 114r or combiner/splitter 113r, 114r thus can be both splitter and/or combiner. The splitter/combiner 113r, 114r or the "device" 113r, 114r thus functions in both directions, i.e., the direction of transmitting and/or the direction of receiving. Thus, depending on whether the power light of the power light source 124 or the signal light of the converter 115r, 105r is regarded, the splitter/combiner 113r, 114r can be referred to as a splitter or as a combiner. Since in one example these combiners/splitters 113r, 114r use a prism for their function, there is no predetermined direction of use. A prism functions in both directions, i.e. it is bi-directional. Separating and/or combining can take place concurrently in a bi-directional manner. In other words, separating and/or combining can take place concurrently and separating and/or combining can take place in a bidirectional manner.

An optical combiner 113t, 113r and an optical splitter 114t, 114r make it possible to carry out the electrical energy supply by means of light by way of the same optical waveguide cable 107, 108 that is also used for distribution of the signals. Furthermore, an optical combiner 113t, 113r and an optical splitter 114t, 114r can be used for transmitting several signals for several radio devices 112t, 112r on the same optical conductor 107, 108.

In a further exemplary embodiment (not shown in FIG. 1) the light for the energy supply 120 could be provided between the feed device 124 and the energy supply device 120 by way of separate optical waveguides. An optical combiner 113t, 113r and an optical splitter 114t, 114r are then not required.

In an airplane all the ceiling plates 117t, 117r or selected monument plains, for example the surfaces or plains of galleys, of built-in galleys, of toilets, of built-in toilets or of lateral linings that are, for example, made from GFP (Glass Fibre reinforced Plastic) or from some other non-conductive material, can comprise at least one antenna 112t, 112r. In other words, these elements may be equipped with at least one antenna. The antennae can be integrated in the structural device of the layout apparatus 111. For example, the antennae 112t, 112r can be arranged on a surface of the structural device 117t, 117r. The antennae 112t, 112r can be broadband antennae. The antennae 112t, 112r themselves can be made from a small quantity of metal. The antennae can comprise a weight in the range of milligrams. For example an antenna can comprise a weight of 0 to 50 mg. Consequently an antenna 112t, 112r only minimally increases the weight of a layout apparatus 111, for example of a lateral lining 111 or a ceiling plate 111. A layout apparatus can comprise a carrier plate 117t, 117r as a structural device 117t, 117r. However, the weight of the structural device 117t, 117r or of the carrier plate 117t, 117r with antenna 112t, 112r remains essentially constant when compared to the weight of the structural device 117t, 117r without the antenna.

A connector which, for example, is adapted for connecting the signal adjustment device 105t, 105r, 115r, 115t to the radio device 112t, 112r or to the radio system device 102 or to the coaxial cables 104, 109, 116t, 116r can also be made from a lightweight material. The connector for the connection itself can thus also have a light weight, with a weight of only a few milligrams. An SMA (subminiature connector type A) connector is an example of a connector, in particular of a connector for a coaxial cable. In other words this means that on the panel 117t, 117r only the antenna connector 121t, 121r for fastening the electronics module 105t, 105r, 115t, 115r is arranged, and on the electronics module 105t, 105r, 115t, 115r, in particular on the separating device and/or on the combining device 113t, 114t, 113r, 114r, the fibre connection 119t, 119r is arranged.

In order to simplify adaptation of the layout apparatus to the respectively used radio system device 102, the first signal adjustment device 115t, 115r and/or the second signal adjustment device 105t, 105r can be designed so as to be modular, in the form of electronics modules. A holding device for the electronics modules 115t, 115r, 105t, 105r is additionally prepared on the structural device 117t, 117r, on the panel 117t, 117r or on the plate 117t, 117r. In one embodiment it is, however, also possible to substantially do without the holding device for the electronics modules if the antenna connector 121t, 121r or the connecting device 121t, 121r is used for holding the electronics module. The antenna 112t, 112r can be contained in a glass fibre laminate or can be applied with its own carrier material to the structural device 117t, 117r or to the plate 117t, 117r. The antenna can thus be affixed to an outside of a structural device; however, it can also be integrated in the structural device itself.

Any radio systems that can provide or further process an electrical antenna signal can be considered as a radio system 102, in particular as a radio system device 102. The radio system 102 or the radio system device 102 can, for example, be a GSM or WLAN radio system. If a plurality of radio systems 102 are used in an airplane, the radio systems can be accommodated together in a shared location. This collective accommodation in a shared location may facilitate maintenance and the exchange or the replacement of the radio systems 102. The shared location can be a central location in an airplane, e.g. a server room. The central location for accommodating radio system devices can be situated outside the passenger region of an airplane cabin. Outside the passenger region it is possible to carry out work while the passengers board the airplane or leave it.

The locations of the arrangement of the antennae 112t, 112r or the locations at which the structural device 117t, 117r are arranged are referred to as antenna integration locations. It is possible that transmission devices 110 or glass fibres 107, 108 have been layed or placed to the ceiling plates 117t, 117r that may form the ceiling of the airplane cabins and that may be assembled by ceiling panels 117t, 117r, or that they have been layed to other antenna integration locations. The transmission devices or the glass fibres may have been layed in order to lead to the antenna integration locations. It is possible that the glass fibres during the production of the airplane already have been layed to or placed to the possible antenna integration locations, in other words to the locations at which structural devices 117t, 117r could be arranged. The optical waveguides 107, 108 or the glass fibres 107, 108 can either be placed as bundles through the fuselage or can be integrated in the fuselage structure.

In particular, in types of airplanes that are produced in lightweight construction, optical conductors 110 or glass fibres 110 could already be integrated in the CFP (Carbon-Fibre-reinforced Plastic) fuselage. These fibres 110 are tapped on fuselage section points or on fuselage section separation locations in order to route connections through the airplane. These pre-laid or pre-installed fibres could be used without essentially increasing the system weight or without significantly increasing the installation expenditure.

By way of the glass fibres 107, 108, 110, the transmit signals Tx can be conveyed from the radio systems 102 to the antennae 112t. Furthermore, the receive signals Rx can be conveyed from the antennae 112r back to the radio systems 102.

If only distribution systems or broadcast systems, for example DVB-T (Digital Video Broadcast-Terrestrial) or DMB (Digital Multimedia Broadcasting), are used, it may essentially be sufficient to provide only one transmit path 113t, 107, 114t. In this arrangement, only the first signal adjustment device 115t and the second signal adjustment device 105t, that are responsible for a direction of transmitting, are connected to the transmit path. In consequence of construction it is thus possible to differentiate between optical waveguides 107 that are associated with a transmit path, and optical waveguides 108 that are associated with a receive path. The distribution systems are only connected to the transmit path, because in distribution systems there is no need for a back channel, nor is a back channel supported.

The ceiling plates 117t are equipped with electronics modules 115t, 115r that are adapted to or specialised for the respective application. In particular, the modulator 105t, 115r and the demodulator 115t, 105r are adapted to the respective radio system. In this way the functionality of the ceiling plate 117t, 117r can be determined In other words, by means of the electronics module 115t, 115r it is possible to determine the type of signal, for example GSM, WLAN, DVB-T, DMB, that is provided by the respective ceiling panel in the footprint covered by it.

Apart from the optical interfaces 119t, 119r the specialised electronics modules 115t, 115r or the combiners 114r/splitters 114t comprise the RF (Radio Frequency) interfaces or RF-connections 121t, 121r that are necessary to provide an antenna connection. The RF-interface 121t, 121r can be adapted to the antenna characteristics of the connected antenna 112t, 112r. It is possible to differentiate between a transmitting module 115t and a receiving module 115r. If necessary, the modules 115t, 115r comprise an amplifier (not shown in FIG. 1) on the transmit side. If the output power on the transmitting module 115t or on the first signal adjustment device 115t that is adapted for transmitting provides output power of the optical converter 115t which is too low, then the amplifier can be used.

The first signal adjustment device 115t, which is used in the direction of transmitting, is an optical→RF-converter 115t, in other words a converter that converts an optical signal to an RF-signal. At the optical input 119t the optical signal can be received, and at the transmission output 121t the corresponding associated RF-signal can be provided. In this arrangement the RF-signal essentially equates to the output signal Tx at the output 103 of the RF-system 102.

On the receiving side, i.e. in the receiving module 115r, band filters, preamplifiers and/or main amplifiers can be arranged or integrated between the antenna 112r and the converter 115.

The electronics modules 115t, 115r can be supplied with energy optically by way of the supply device 120. A light source 124 generates light for electrical energy supply, which light can comprise a narrow bandwidth and high intensity. This light can be converted to electrical energy with great effectiveness or efficiency if a photocell 120 with a matching bandgap is used as an energy source 124. The electronics modules 115t, 115r essentially require only little power or energy, because the supply region that is to be supplied by an individual ceiling element 117 or ceiling panel 117 is limited. It is therefore, generally speaking, possible to optically supply the antennae or radio devices 112t, 112r in the layout apparatuses 111, 117t, 117r. In other words, antennae can be operated at any locations in the airplane.

In order to keep the transmitting powers of the transmitting modules 115t on the individual plates 117t, 117r or structural devices 117r, 117t low, and in this manner make possible an optical energy supply, the radio systems 102 can be separate from each other, in other words they can be distributed to various antenna systems. It may therefore be a design criterion to provide a layout apparatus 111 that gets by with little transmitting power, and consequently the optical energy supply of the modules 115t, 115r may be ensured. Thus, the layout apparatus may require only little transmitting power. The radio systems 102 should therefore also be separate from each other, i.e. distributed to various antenna systems. In other words, a transmit signal Tx may be conveyed to a first antenna system 117t, 112t for transmitting, while the receive signal Rx may be received by some other antenna system 117r, 112r. The antenna 112t, 112r itself could serve all the systems 102 at the same time; however, by using the optical supply the power may not be adequate or sufficient, and the converters 115t, 115r might furthermore be overloaded with the high bandwidth since the sum signal from all the systems 102 may comprise too broad a band. The converters might not be able to provide sufficiently wide bandwidth for a broad band signal generated as sum signal from all systems.

Consequently, each output 103 may be associated with a first antenna system 112t, 117t, and each input 122 may be associated with another, second, antenna system 112r, 117r.

In particular when using of an interferer as a radio system device 102 as, for example, used for a GSM-on-board system, a broad bandwidth is may be required. In order to provide such a broad bandwidth, on the RF-system side 102 or on the radio system device 102 a band division could be carried out, wherein the transmission spectrum can be divided into several transmission devices 110, 107. After the division of the transmission spectrum (band division) the individual parts of the divided transmission spectrum may be emitted by various antennae at the necessary low power per antenna. In a GSM-system, in particular in a GSM-system on board an airplane, it may be necessary, for example, for all the other mobile radio systems, for example an earth-based GSM-system, to be subjected to interference. Therefore the interference signal itself can be of a very broadband nature and can be strong. Such a strong broadband interference signal could overload the converters 115t, 115r and would be difficult to amplify on the antennae. However, the signal spectrum of the interference signal can be divided into blocks, and each block comprising a predeterminable bandwidth can be allocated to a separate antenna 112t and thus to a separate structural device.

For example, a block comprising the bandwidth 0-1500 MHz can be transmitted as a first block 1 to a first antenna and/or to a first antenna group, while a block comprising the bandwidth 1500-4000 MHz can be transmitted as block 2 to a further antenna group, which may be located on another structural device. Thus a total bandwidth of 0-4000 MHz can be transmitted by means of separate antennae. Since after emission the signals become superimposed, a total bandwidth of 0 to 4000 MHz is available in the air, i.e. in the interior of the room.

The optical energy supply can use the same fibre 107, 108 that is also used for signal transmission. As a result of this shared use of the transmission device 110, 107, 108 it is possible to reduce not only the connector weight but also the connector size on the electronics module 115$t$, 115$r$, wherein the electronics module is installed in the plate 117$t$, 117$r$ or in the structural device 117$t$, 117$r$.

Since the distances to be bridged in an airplane can be short relative to the losses, only low transmission losses may occur. Because of the essentially low transmission losses, in one embodiment it is possible to substantially do without signal regeneration. Therefore, in order to keep the complexity of the electronics to a minimum, a purely analogue modulation method can be used. In other words this means that an electrical antenna signal or electrical input signal is converted to an essentially pure analogue optical signal. For this conversion an analogue modulation method is used. As a result of the use of the analogue modulation method the optical transmission route 110, 107, 108 can be considered to be an analogue transmission route or as an analogous transmission route. Viewed at the ends of the transmission route, said transmission route may essentially behave in the manner of a coaxial cable. In other words, the optical transmission route, which when regarded from the outside represents a coaxial cable, can be considered to be an analogue transmission route.

In particular, this means that the transmission route in the direction of transmitting from the connection 103 of the radio system device 102 to the coaxial cable 116$t$ of the transmitting antenna 112$t$ can be considered to be an analogue transmission route 107.

Furthermore, the route from the receiving antenna 112$r$ to the receive input 122 of the radio system device 102 can also be considered to be an analogue transmission route.

In other words, this can also mean that the optical transmission system 110 is transparent to the antenna 112$t$, 112$r$ and to the radio system device 102 and is considered to be a coaxial line system, although in one section the coaxial cable has been replaced by an optical cable or by an optical transmission route.

If there is a demand for this, it would also be possible to combine the signals of/for several antennae 112$t$, 112$r$, for example the transmit signal, or furthermore the receive signal Tx, Rx, using various colours on a single fibre and at substantially the same time to transmit the signals. This will then require several modules of the same transmission range, e.g. WLAN (transmission range 2400 MHz-2500 MHz), which modules either support selectable transmission wavelengths, or for each transmission wavelength or for each colour used a respective module type so that WDM-separation can be carried out at the module and so that for each respective antenna position the correct antenna signal is generated or received.

To ensure adequate cover of the supply region, the structural device 117$t$, 117$r$ or the plates 117$t$, 117$r$ in various regions are driven by the same radio system 102. In this arrangement, Y-elements or power splitters can be used. A power splitter couples a defined component of the energy or of the light out from the optical source conductor, e.g. 90 to 10 or 50 to 50. 90 to 10 denotes that essentially 10% of the existing light is decoupled or coupled out. Thereafter, i.e. in the signal direction behind or downstream of the power splitter, the "two" signals, on the actual several fibres, are amplified back or re-amplified to the required level.

The driving or the actuation by the same radio system in various regions can take place by coupling out the antenna signal Tx to several fibres and amplifying signals in the several fibres. In other words, the same radio system can carryout the driving in various regions by coupling out the antenna signal Tx to several fibres and by amplifying the signals in the several fibres. Because the signal was, for example, split by means of a Y-element or power splitter, signals with different but lower signal energies may exist in the fibres onto which the signal was split. By coupling out the signals to several fibres, and if necessary by downstream (nachgeschaltet) amplifying the signals of several fibres, a plurality of distributed plates 117$t$, 117$r$ can be controlled by a single radio system 102; in particular the antennae on the plates can be driven or controlled. Furthermore, several plates can provide their receive signals—optionally after a possible correction of phase differences of the receive signals—to a single radio system 102. A Y-element 106, 123 or a switch point 106, 123 can be used for splitting or combining the transmit signal Tx or the receive signal Rx.

The supply region, which may be composed by a plurality of plates and in particular by the cover region formed by the antennae of the plates 117$t$, 117$r$, can therefore result as a pattern. Every $n^{th}$ panel may be equipped with a first system X, e.g. WLAN; every $m^{th}$ panel may be equipped with a system Y, e.g. GSM. Thus a pattern for good signal supply or coverage within the interior space results in relation to the dividing up or the distribution of the systems or of the various types of signal adjustment devices, which pattern results, for example, from a regular arrangement of the systems of type X or of type Y.

The output power of the electronics modules 115$t$, 115$r$, in particular of the first signal adjustment device 115$t$, 115$r$ or of the optical-electrical converter near the antenna 112$t$, may be low. This low output power can, however, be sufficient if several antennae and a limited bandwidth are used. Amplification of the signal may require filters that remove from the signal unwanted secondary emissions, interfering emissions or parallel emissions (Nebenaussendungen) generated as a result of amplification. With the use of favourable non-linear amplifiers, after amplification additional signals may appear that lay outside the input signal range or outside the frequency range of the input signal. These components can essentially be filtered out. If the output line or output power of the optical→RF converter 115$t$ is sufficient, it would also be possible to use several antennae in order to amplify the signal at least after emission. In this case only a smaller region of the interior room, in particular of the passenger cabin, would have to be supplied by each antenna 112$t$, 112$r$. A lower power per antenna may thus be sufficient. However, in that case several antennae should be used, and, furthermore, signal multiplying for the antennae should be used.

However, such filters could result in an increase in weight, and therefore the number of filters should be kept small.

The use of many weak transmitting stations or of a plurality of antennae 112$t$, 112$r$ with low output power can reduce the radiation load to which passengers and the systems are exposed.

By replacing at least part of a coaxial line system by lightweight glass fibre cables 107, 108 it is possible to achieve a lighter weight for a transmission system 110. Coaxial cables can weigh approximately 135 g/m, whereas an optical cable with 12 fibres essentially weighs only 8 g/m. Generally speaking, larger bundles are more lightweight per fibre than are individual fibres or smaller bundles. If larger bundles are selected it should be taken into account that complex bundles are difficult to process or repair. The exchangeable layout apparatuses 111, in particular the exchangeability of the panels 117t, 117r or of the electronics modules 115t, 115r, can increase the flexibility because the optical infrastructure is not tied to special systems but instead, within a certain frequency framework, supports all the radio systems 102. In particular, radio systems can be used that can provide and/or process an antenna signal Tx. The antenna 112t, 112r itself can either be installed as a single module on the ceiling plate, or it can be directly integrated in the panel 117t, 117r. Integration can make it possible to achieve a further weight reduction. In other words, the system is intended to support essentially all types of radio systems for passengers, for example GSM, UMTS (Universal Mobile Telecommunications System), LTE (Long Term Evolution) and WLAN, WiMax™, DVB-x and DMB-x (wherein "x" denotes any DVB or DMB system), DAB.

Maintainability of the communication system 100 can be simplified because all the radio systems 102 can be arranged at a shared location in the airplane. The shared location can, for example, be centrally arranged. For example the shared location can be a shared server room that can be accommodated outside the passenger region. Thus if a device is faulty the device can be exchanged without passenger operations being significantly affected as a result thereof, because no maintenance work within the passenger cabin is necessary.

Connecting antennae that are distributed over the cabin or airplane cabin by glass fibre and electrical-optical converters 115t, 115r, 105t, 105r can make it possible to obtain a more lightweight construction than would be possible with the use of coaxial cables. In combination with broadband antennae 112t, 112r integrated in ceiling plates 117t, 117r, a lightweight cabin antenna infrastructure can be constructed that covers a wide field of requirements.

It is thus possible to adapt the connection of antennae 112t, 112r in an airplane cabin or in an airplane interior room.

The term "RF" (Radio Frequency) is intended to refer to the antenna signal Tx, Rx at the RF output 103 or to the RF-input 122 of the RF-system 102, in other words the modulated electrical/electromagnetic signal.

Figure 2:
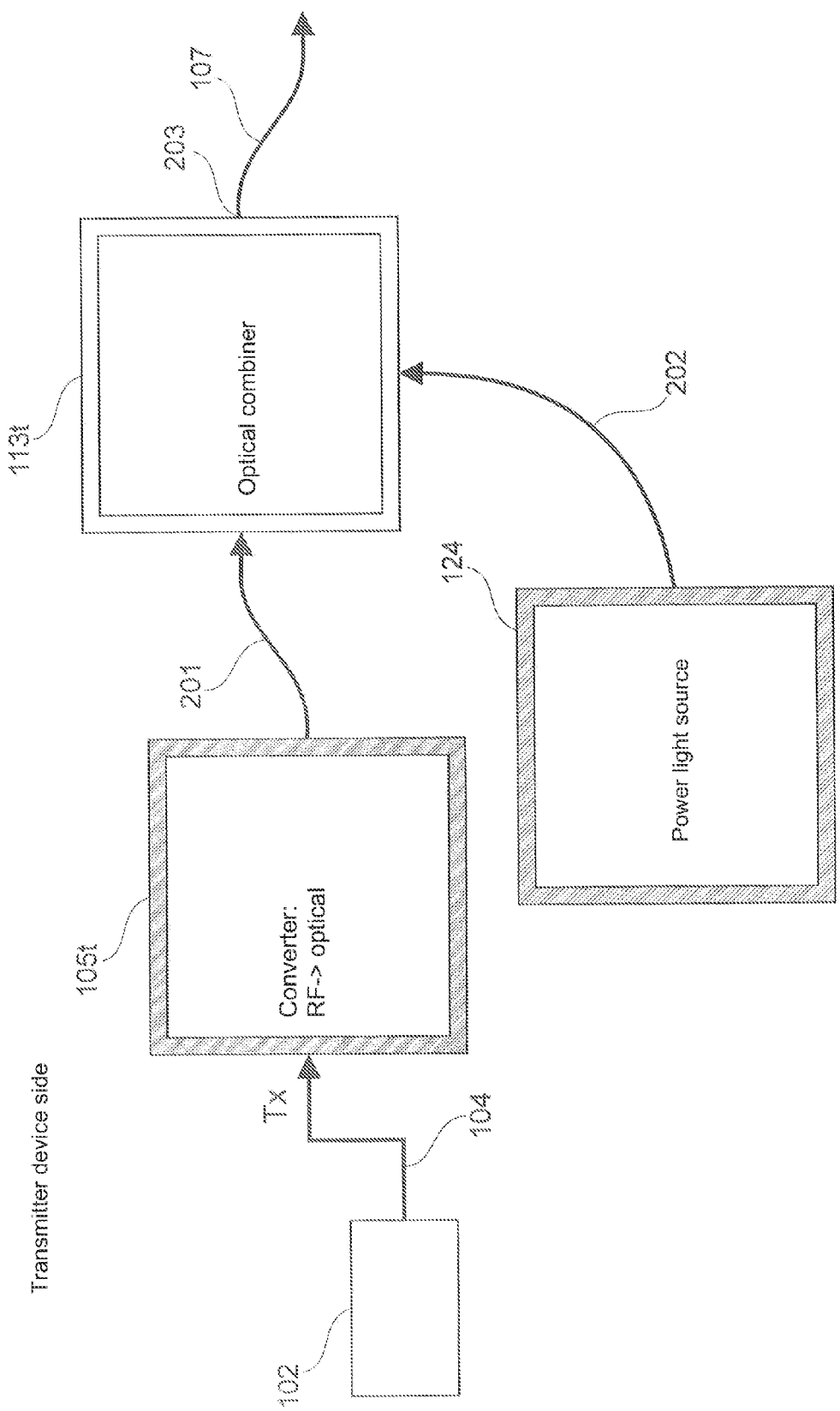
FIG. 2 shows a detailed block diagram of a transmitter or a sender of the communication system on the device side according to an exemplary embodiment of the present invention.

FIG. 2 illustrates the electrical-optical conversion, the electrical to optical conversion, the RF to optical conversion or the conversion RF→optical by means of a transmitter 105t on the device side of the communication system 110. In this arrangement, the device side may designate the region or location at which the RF-system 102 or the radio system device 102 is arranged, for example the central server room. By way of the coaxial cable 104 the RF-system 102 provides the useful RF-signal Tx or the wanted RF-signal or the wanted RF-payload signal of an RF-system 102. A WLAN access point is one example of an RF-system 102. The provided signal is channel-limited and essentially does not require any further filtering. The RF-transmit signal Tx is made available to the first signal device 105t or to the converter RF→optical. Generally speaking, → or → may designate the direction of the conversion.

A suitable converter 105t (with an adequate dynamic range, an adequately low noise figure, etc.) modulates the RF-signal Tx onto the light as an oscillation in brightness. The signal-to-noise ratio (SNR) should be sufficient so as essentially not to falsify or degrade the signal. This illustrates that the converter 105t is designed as an analogue system. In other words this means that an RF-signal or an electrical oscillation is converted to a light of a corresponding intensity or oscillation in brightness. However, since light essentially does not make it possible for negative amplitudes to occur, a certain quiescent light or offset is assumed, from which then a respective light can be deducted, or to which it can be added. This corresponds to an analogue conversion of an RF-signal or electrical signal to an optical signal. In one example the real component in the RF-signal is mapped for brightness with an offset, which essentially corresponds to multiplication, in other words mixing, or to amplitude modulation, of the source light. In another example, during the conversion of an electrical signal to an optical signal a crystal of a laser may be deformed by the electrical signal, as a result of which it is possible to achieve modulation of a quiescent light, of an optical carrier, of an optical offset, or of an optical direct current. In yet another example, a plate can oscillate in the rhythm of the electrical signal, as a result of which a laser beam that impinges the plate may be deformed, so that optical modulation may be achieved.

The quiescent light represents the optical carrier. The optical carrier of the optical signal has a wavelength that differs from that of the power light source 124. As a result of the optical transmit signal and the signal of the power light source comprising different wavelengths, after combination by means of an optical combiner 113t both signals can be transmitted by way of the same glass fibre. By way of the coaxial cable 201 or optical waveguide 201, after the conversion the transmit signal Tx that has been converted to an optical signal is made available to the optical combiner 113t. In other words this means that both in direction of transmitting and in the direction of receiving, the optical signal and the electrical signal comprise essentially the same information, except modulated in different physical quantities. The content of the optical signal in the direction of transmitting corresponds to the content of the electrical signal in the direction of transmitting. The content of the optical signal in the direction of receiving corresponds to the content of the electrical signal in the direction of receiving.

The power required for supplying power to the remote modules 115t, 115r is provided by the power light source 124 also by way of the fibre-optic cable 202. At its output 203, by way of the optical light waveguide cable 107 the optical combiner 113t supplies a combined signal that can be transmitted to the remote antenna 112t by way of the fibre 107. In the optical combiner 113t the optical output signals of the converter 105t and of the light source 124 are combined onto a fibre 107.

The power light source 124 generates a narrowband light that can essentially be converted on PV (Photo Voltaic) cells (photocells) with a matching bandgap. The wavelength of the power light source 124 differs from that of the optical converter 105t. The light source 124 is electrically supplied.

Both the converter 105t, 105r and the power light sources 124 are supplied with power by way of the electrical on-board network of the airplane. For this reason they have a current supply system or power supply system adapted to the airplane system. For adaptation to the on-board network a power supply with 115V and a frequency of 400 Hz can be provided, or a connection to the 28 V on-board network. For example a terminal for the 28V on-board network can be available on the power supply system.

Figure 3:
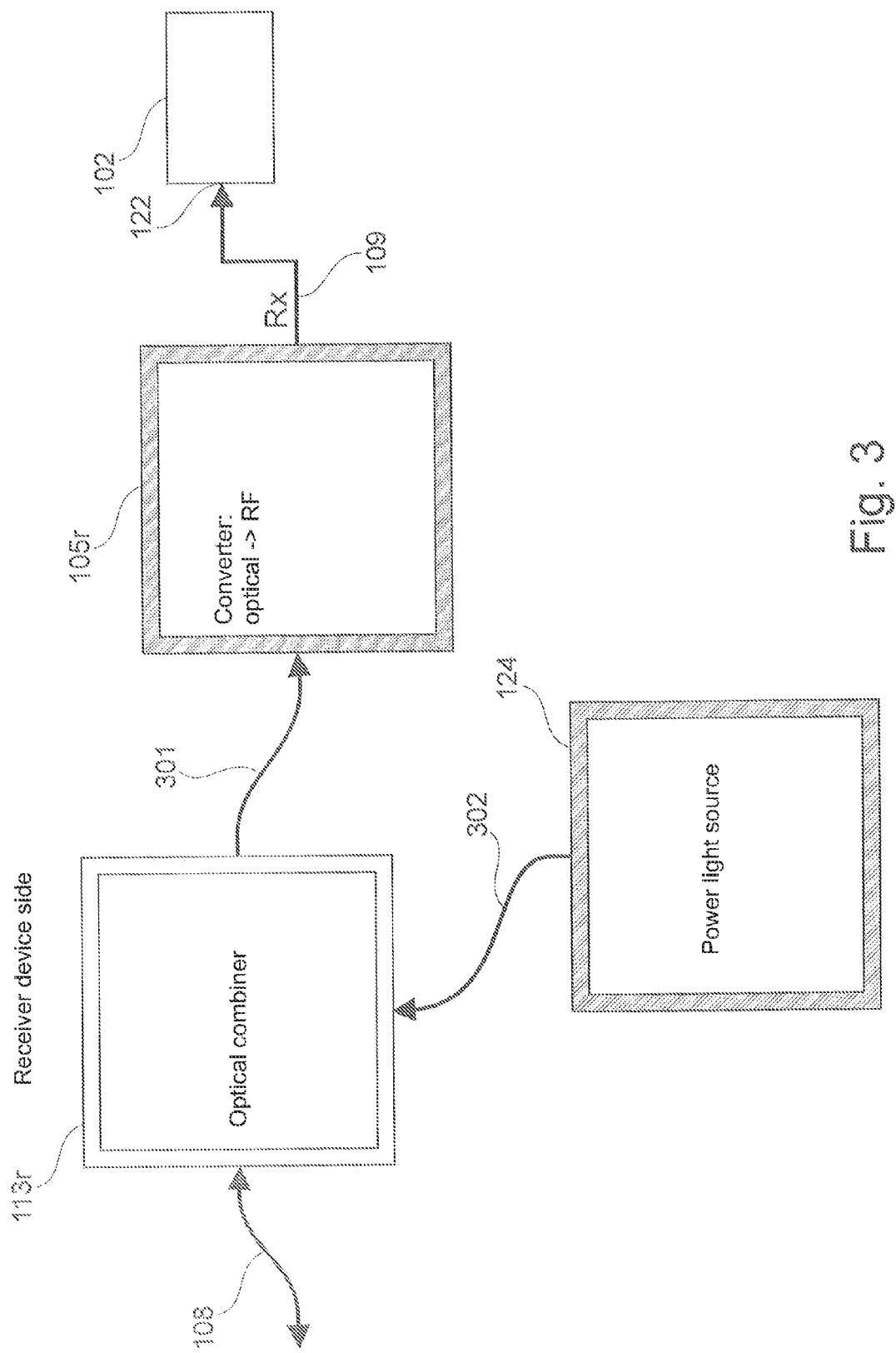
FIG. 3 shows a detailed block diagram of a receiver of the communication system on the device side according to an exemplary embodiment of the present invention.

FIG. 3 shows a detailed block diagram of a receiver on the device side, i.e. in close proximity to the RF-system 102. By way of the fibre 108, which transmits the combined signal from the remote antenna 112r, the optical combiner/splitter 113r receives the receive signal Rx from the antenna 112r. In the combiner/splitter 113r the optical receive signal Rx from the antenna 112r is conveyed to the converter 105r, and the supplying light of the power light source 124 is conveyed to the fibre 108. In other words, the optical signal is conveyed from the antenna 112r by way of the optical waveguide 301 to the converter optical→RF 105r or to the second signal adjustment device 105r. The converter 105r converts the optical receive-signal of the antenna 112r to an RF-signal Rx, in particular to the antenna signal Rx for the receiver RF-system 102. A suitable converter 105r (with an adequate dynamic range, an adequately low noise figure etc.) converts the brightness oscillations impressed onto the light to the Rx signal. In other words, the combiner/splitter 113r in combination with the converter 105r converts the oscillation in brightness on the light conductor 108 to an RF-signal Rx. The conversion may be carried out by means of mixing down. Mixing down can take place from the terahertz range. In the terahertz range, AM (amplitude modulation) may be used for mixing down. In the converter 105r a conversion from one transmission medium to another may take place. Mixing down can be compared with demodulation, wherein "true" demodulation and modulation essentially takes place only in the passenger devices and access points 102.

Optical→electrical conversion and electrical→optical conversion thus essentially represents "mixing". In this arrangement the frequency of the signal may shift, because the signal is shifted from the optical range to the RF range and vice-versa. Since the light plays an important role in this process, generally speaking the impression of the signal onto the light could be referred to as modulating, while the removal or extraction of light could be referred to as demodulating.

In other words, the converter 105r converts oscillations in brightness to electrical signals Rx. The optical carrier, the optical offset or the optical direct current by means of which the converter 105r operates has a wavelength that differs from the wavelength of the power light source 124. The carrier itself may be used for mixing down in the demodulator 105r. In other words, the wavelength of the carrier that is used for data transmission differs from the wavelength of the power light source 124 that is used for the power transmission and/or for the energy transmission. For example, the power light source 124 can operate with green light while data transmission may use red light. Thus while the optical antenna signal of the antenna 112r is received in the optical combiner/splitter 113r, the optical signal of the power light source 124 can be transmitted by the combiner/splitter 113r in the direction of the antenna 112r.

The optical combiner/splitter 113r is connected to the power light source 124 by way of the light conductor 302. The light source 124 or power light source 124 generates a narrowband light which on PV-cells (photocells) with a bandgap adapted to the narrowband light can essentially be converted in a highly efficient manner. The wavelength of the power light source differs from the wavelength of the optical converter. The power light source 124 is electrically supplied by way of the on-board network of the airplane.

The receive signal Rx that has been converted back to an electrical signal is provided to the RF-system 102 by way of the coaxial cable 109. In this arrangement the useful RF-signal Rx of the antenna 112r is made available to the RF-system, for example to the WLAN access point 102, at the antenna input 122 or RF-input 122. The signal received at the input 122 is band-limited and requires only channel filtering in terminal 102, for example in the WLAN access point.

Figure 4:
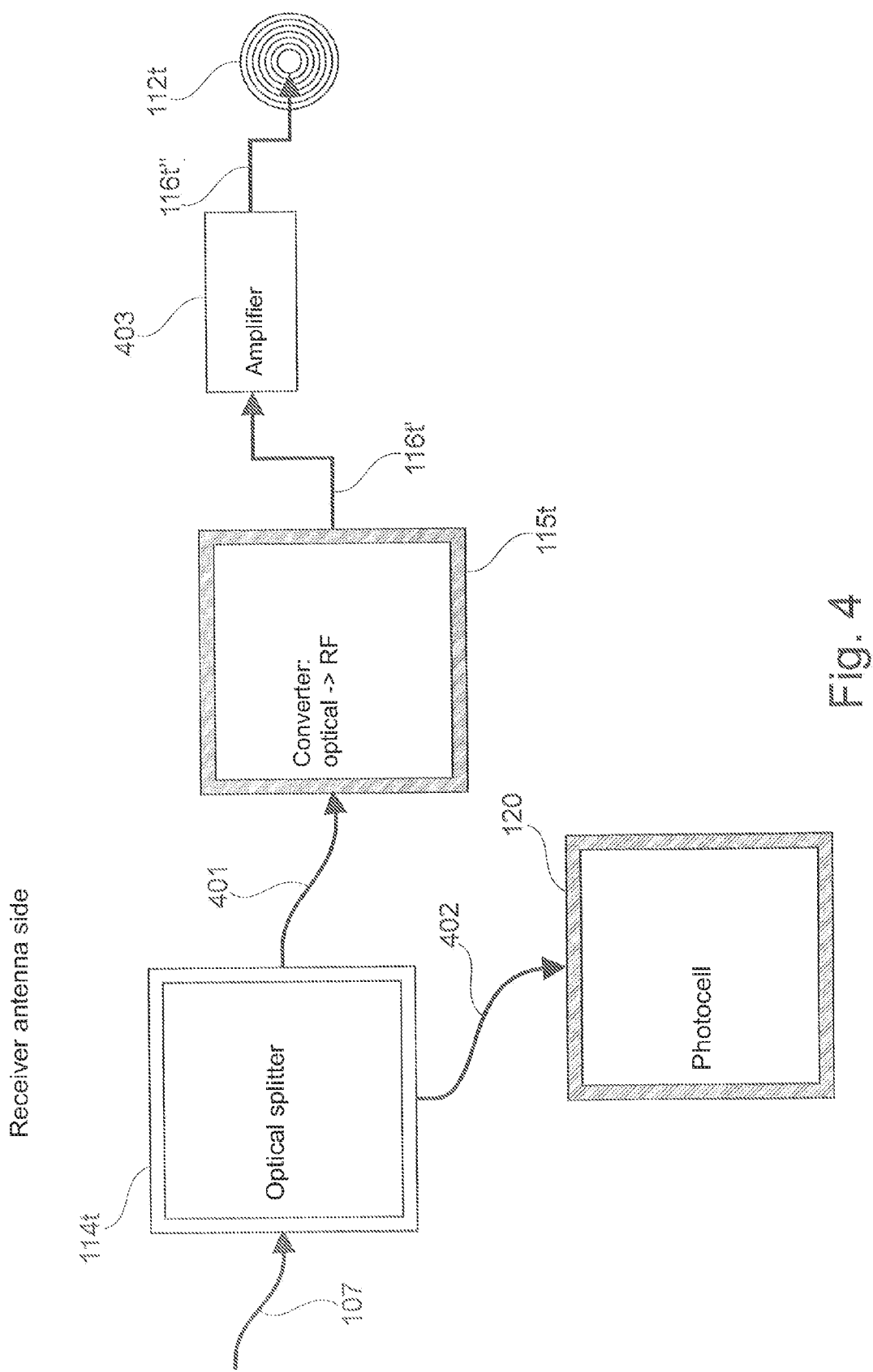
FIG. 4 shows a detailed block diagram of a receiver of the communication system on the antenna side according to an exemplary embodiment of the present invention.

FIG. 4 shows a mixer 115t, receiver 115t or demodulator 115t on the antenna side; in particular, FIG. 4 shows a first signal adjustment device 115t on the antenna side. The fibre 107 or the light conductor 107 transmits the combined optical signal to the remote antenna. The fibre-optic waveguide 107 is connected to the optical splitter 114t. In the splitter 114t the optical receive signals are conveyed from the RF-system 102 to the fibre 401 of the converter 115t, and the supplying light of the light source (not shown in FIG. 4) is conveyed to the photocell 120.

By way of the power-supply glass fibre 402 the light for the photocell 120 is forwarded to the photocell 120. By way of the signal glass fibre 401, which optically connects the optical splitter 114t to the converter optical→RF 115t, i.e. to the converter that converts the optical signal back to the antenna signal Tx or to the RF-signal Tx, essentially the antenna signal Tx of the remote RF-system 102 is forwarded to the first signal adjustment device 115t.

A suitable converter 115t comprises a corresponding dynamic range, a corresponding noise figure etc. The converter 115t demodulates the RF-signal Tx or the useful signal Tx from the oscillations in brightness impressed on the light. The wavelength of the optical carrier or of the optical offset of the useful signal differs from the wavelength of the power light source, which is the reason for splitting by means of the optical splitter 114t being possible.

By way of the coaxial line 116t' and 116t" the converter 115t is connected to the transmitting antenna 112t by way of an amplifier 403. The coaxial cable 116t' comprises the useful RF-signal for the antenna 112t from the RF-system 102, for example the useful signal Tx from the WLAN access point. This useful RF-signal Tx is channel-limited and requires filtering only if there is subsequent amplification.

The photocell 120 (PV-cell) with adjusted bandgap essentially converts the supply light to electrical energy or to electrical power. The photocell 120 supplies the converter 115t by way of a DC-DC converter (direct current-direct current converter) with energy (the DC-DC converter is not shown in FIG. 4).

Figure 5:
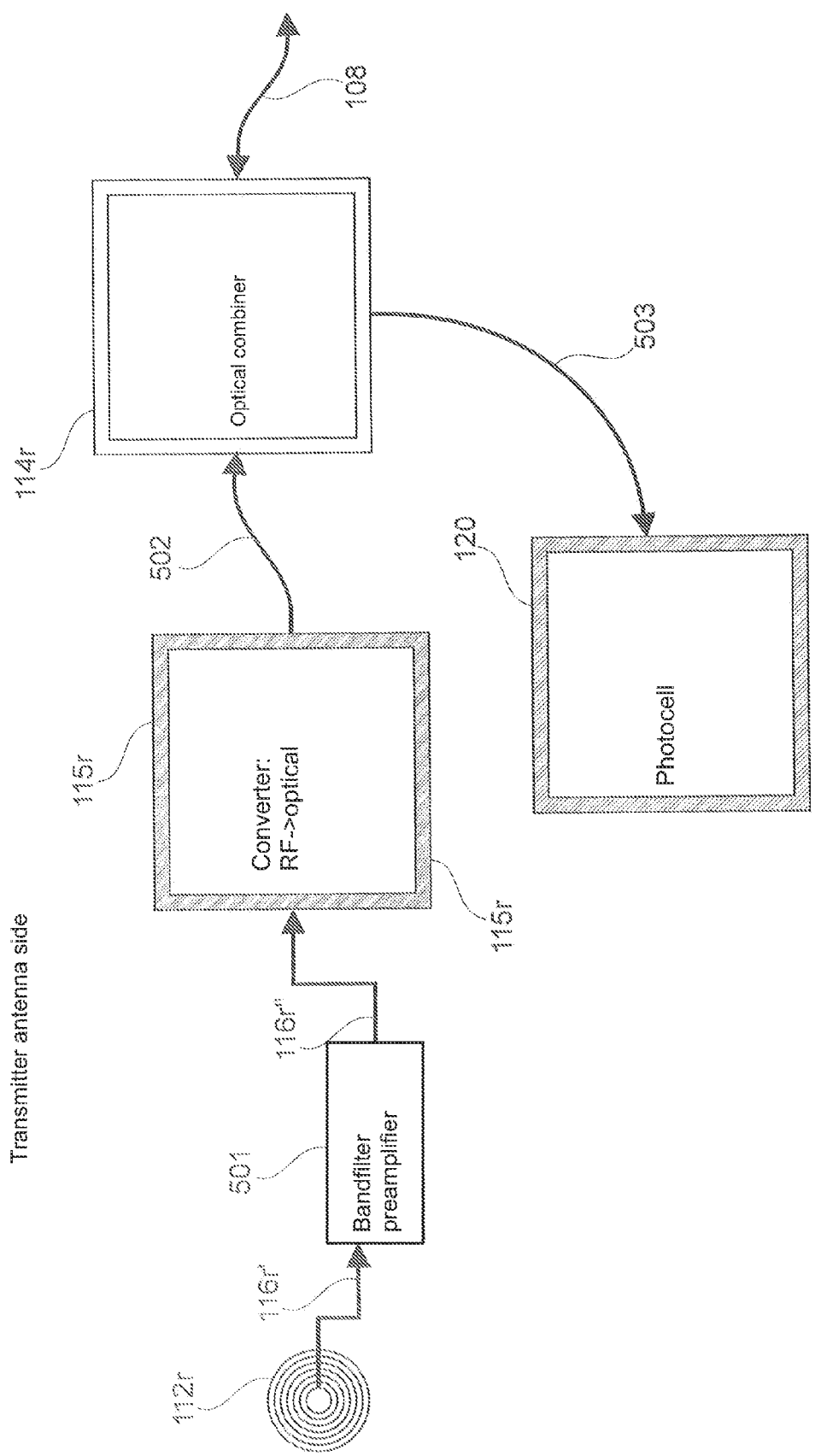
FIG. 5 shows a detailed block diagram of a transmitter of the communication system on the antenna side according to an exemplary embodiment of the present invention.

FIG. 5 shows an optical transmitter 115r or the first signal adjustment device 115r on the antenna side. The receiving antenna 112r provides the electrical receive signal Rx to the band filter with preamplifier 501 by way of the coaxial line 116r'. After amplification and filtering, the electrical receive signal Rx is forwarded as a useful RF-signal from the antenna 112r to the converter 115r by way of the coaxial line 116r". The useful RF-signal is band-limited.

The electrical-optical converter 115r, the converter 115r that converts or modulates the received electrical antenna signal to a corresponding optical signal, or the converter RF→optical 115r represents a suitable converter in relation to dynamic range, noise figure etc. The converter 115r modulates the RF-signal Rx of the antenna 112r onto the light as an oscillation in brightness. Since light essentially does not make it possible for negative amplitudes to occur, light of constant intensity or of a constant offset is assumed, onto which the optical signal is correspondingly impressed. Thus the optical signal provided by way of the fibre-optic waveguide 502 is an analogue optical signal. The optical combiner/splitter 114r receives the light energy for feeding the photocell 120 and combines the received antenna signal onto the fibre 108 for transmission in the direction of the RF-system 102.

The combiner/splitter 114r, 113r uses prisms, and for this reason there is no predetermined direction of use. Prisms function in at least two directions (bi-directionally), and moreover they function in both directions at the same time.

The fibre 108 is operated bi-directionally because the direction of propagation of the light of the power light source and the direction of the light comprising the useful signal are opposite directions.

The fibre 108 or the receiving fibre 108 transmits the combined signal, comprising the light power signal and the antenna signal. The antenna signal is transmitted by the antenna 112*r* to the remote RF-system 102 (not shown in FIG. 5). In relation to a stand point or reference point in the server room, the antenna 112*r* may be a remote antenna. In the optical combiner 114*r* the optical output signals are conveyed by the converter 115*r* or modulator 115*r* to the fibre 108, and the power light of the power light source 124, which power light is used for supplying the components of the panel 117*r* or of the structural device 117*r*, is decoupled from the fibre 108. By way of the fibre 503, the light is conveyed for supplying power to the photocell 120. The photocell 120 (PV-cell) with adapted bandgap essentially converts the supply light to electrical energy. The photocell supplies the converter 115*r* and the amplifier 501 with energy by way of the DC-DC converter.

Figure 6:
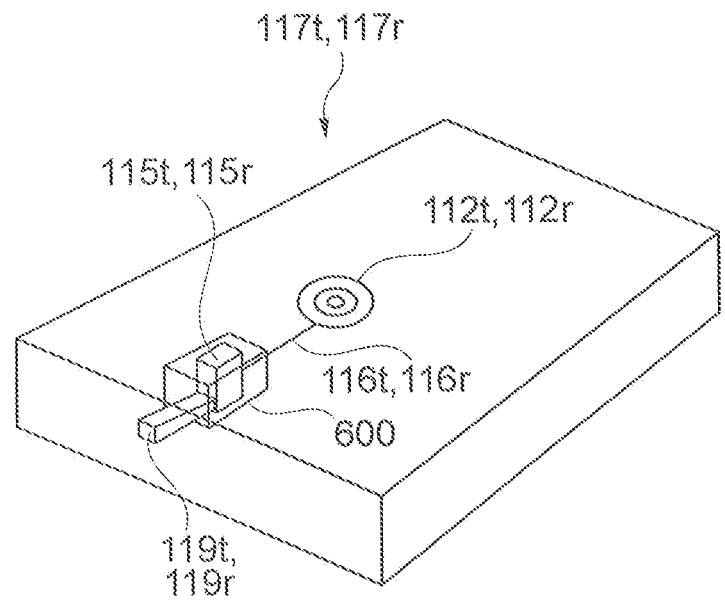
FIG. 6 shows a three-dimensional top view of a layout apparatus according to an exemplary embodiment of the present invention.

FIG. 6 shows a structural device 117*t*, 117*r* with an integrated antenna 112*t*, 112*r*, a first signal adjustment device 115*t*, 115*r*, a module carrier 600 and a connection or terminal 119*t*, 119*r* that is connected to the module carrier. The connection 119*t*, 119*r* is adapted as a socket for receiving or accommodating an optical waveguide for the electronics module 115*t*, 115*r*. In order to provide access 119*t*, 119*r* to the connection of the electronics module 115*t*, 115*r*, an opening 119*t*, 119*r* for letting an optical conductor or light conductor through may be provided in the structural device 117*t*, 117*r*.

In other words this may mean that in the structural device 117*t*, 117*r* an opening 119*t*, 119*r* for an optical conductor can be provided, through which opening 119*t*, 119*r* a connector, a plug or connection for the optical conductor, affixed to the electronics module 115*r*, 115*t*, can be reached. In one example the opening 119*t*, 119*r* for the optical conductor can be adapted as an optical conductor connection 119*t*, 119*r* with a corresponding connector or a corresponding socket.

In another example the optical conductor can lead in an invisible region to the electronics module 115*r*, 115*t*. For example, the cable can be hidden by the structural device 117*t*, 117*r* and can be invisible from the passenger compartment. The optical conductor can thus be routed so as to be behind the structural device. In this arrangement, the optical conductor can also be routed on the structural device or on top of the structural device.

Furthermore, the module 115*t*, 115*r* may comprise a connection for the antenna 112*t*, 112*r*. The antenna connection may be arranged in such a manner that when the mode or module 115*t*, 115*r* is inserted in the module carrier 600 a contact is established between the antenna connection of the module and the coaxial cable 116*t*, 116*r*.

In an installed state the module in the module carrier 600 may be aligned in such a way that the optical conductor can be inserted in the module 115*t*, 115*r* by way of the connection 119*t*, 119*r*.

The recess 600, the module carrier 600 or the receiving device 600 for a module can comprise a guide system such as rails, which guide system facilitates positioning of the module 115*t*, 115*r*. Furthermore, the module carrier 600 is connected to the coaxial line section 116*t*, 116*r*, which is connected to the antenna 112*t*, 112*r*, in such a way that when the converter 115*t*, 115*r* is inserted a connection with the coaxial line section 116*t*, 116*r* is possible.

The modular design makes it possible, by exchanging the electronics module 115*t*, 115*r* or by exchanging the first signal adjustment device 115*t*, 115*r*, to use the structural device 117*t*, 117*r* according to the function provided by the electronics module 115*t*, 115*r*. In this arrangement the bandwidth of the radio device 112*t*, 112*r* may be sufficiently broad for a predeterminable number of radio system devices 102, and in particular their frequency ranges, to be covered. Thus, a ceiling panel 117*t*, 117*r* can, for example, quickly be exchanged from a WLAN ceiling panel, in other words a ceiling panel that provides WLAN-signals, to a GSM ceiling panel, in other words a ceiling panel that provides GSM-signals, substantially without there being a need to exchange the radio device 112*t*, 112*r*.

The connection 119*t* can be arranged on any side of the structural device 117*t*, 117*r*. For example, the connection 119*t*, 119*r* could be arranged in such a manner that it is connectable to an optical waveguide system 110 integrated in an airplane fuselage. In this arrangement, standardisation of the connections could ensure good contact.

Figure 7:
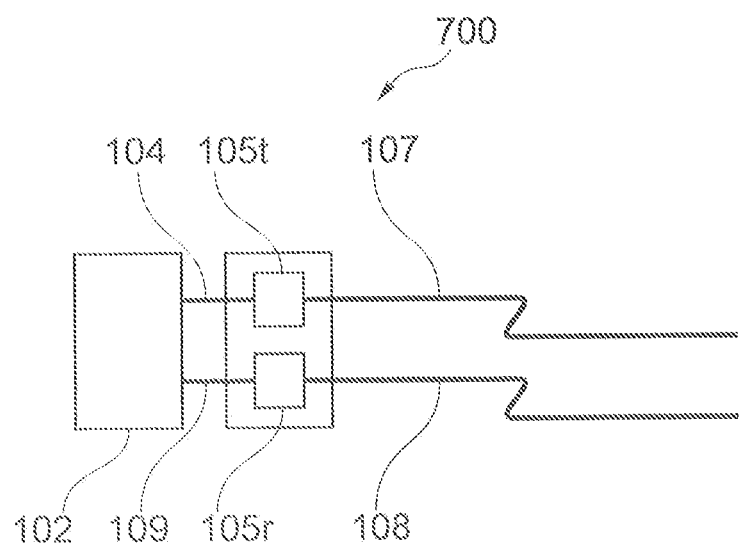
FIG. 7 shows a diagrammatic block diagram of a radio apparatus according to an exemplary embodiment of the present invention.

FIG. 7 shows a radio apparatus 700 or radio system apparatus that comprises the radio system device 102 and a second signal adjustment device 105*t*, 105*r*. The second signal adjustment device 105*t*, 105*r* is connected to the radio system device 102 by means of coaxial lines 109, 104. The second signal adjustment devices are also connected to optical waveguides 107, 108 that lead to remote transmit antennae or receive antennae (neither of them shown).

Figure 8:
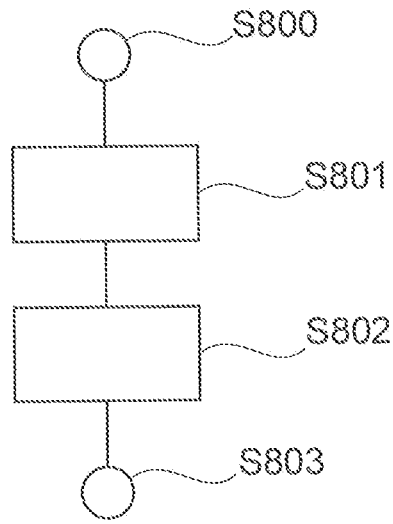
FIG. 8 shows a flow chart for a method for communicating by means of a layout apparatus according to an exemplary embodiment of the present invention.

FIG. 8 shows a flow chart relating to a method for communicating by means of a layout apparatus, wherein the method starts in an idle mode in step S800, and in step S801 carries out conversion of an antenna signal between an electrical quantity and an optical quantity by means of a first signal adjustment device.

Depending on the design as a transmitting device or receive device, in step S802 transmitting and/or receiving the antenna signal as a radio signal takes place by means of a radio device wherein the first signal adjustment device is arranged in a structural device of the layout apparatus. Furthermore, the structural device is adapted for configuring the interior room. After transmitting or receiving, the method ends back in an idle mode S803.

Figure 9:
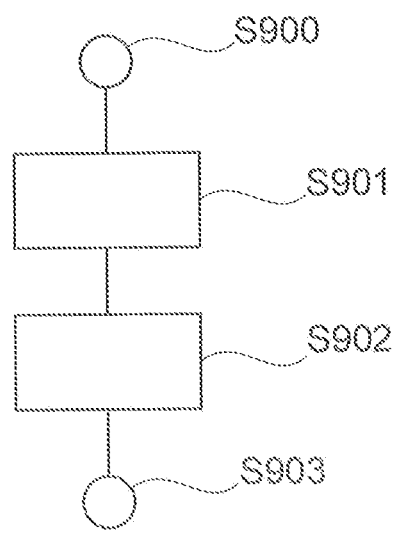
FIG. 9 shows a flow chart for a method for transmitting an antenna signal according to an exemplary embodiment of the present invention.

FIG. 9 shows a flow chart relating to a method for transmitting an antenna signal. The method starts in the idle mode S900. In step S901 generating and/or receiving an antenna signal takes place in a radio system device 102. In step S902 the antenna signal is converted between an electrical quantity and an optical quantity by means of a second signal adjustment device, and in step S903 the method ends in an idle mode. In the case of the radio system device generating an antenna signal, the antenna signal of the second signal adjustment device is provided and is converted from the electrical quantity to an optical quantity.

During receiving of an antenna signal, an optical signal is received in the second signal adjustment device and is converted to an electrical quantity that is provided as an antenna signal to the radio system device.

In addition, it should be pointed out that "comprising" does not exclude other elements or steps, and "a" or "one" does not exclude a plurality. Furthermore, it should be pointed out that elements or steps which have been described with reference to one of the above exemplary embodiments can also be used in combination with other elements or steps of other exemplary embodiments described above. Moreover, while at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A layout apparatus for communicating, comprising:
    a modular layout element;
    a first signal adjustment device in the form of an electronics module;
    a radio device;
    a module carrier holding the first signal adjustment device; and
    a connecting device connected to the module carrier for accommodating an optical conductor so that the optical conductor is hidden by the modular layout element, the connecting device further connecting the first signal adjustment device to the optical conductor;
    wherein the modular layout element is adapted for configuring a room;
    wherein the first signal adjustment device is adapted for electrical-optical and/or optical-electrical conversion of an antenna signal; and
    wherein the module carrier, the radio device and the connecting device are integrated in the modular layout element;
    wherein the radio device is connected to the first signal adjustment device in such a manner that the antenna signal can be transmitted and/or received as a radio signal; and
    wherein the first signal adjustment device is exchangeable for providing different types of wireless functionality.

2. The layout apparatus of claim 1, wherein the radio device is a radio device selected from the group of radio devices consisting of:
    an antenna;
    an antenna array;
    a stripline conductor;
    an electronic antenna; and
    a broadband antenna.

3. The layout apparatus of claim 1, wherein the modular layout element is selected from the group consisting of:
    a ceiling plate;
    a ceiling panel;
    an interior lining;
    a fuselage structure;
    a monument;
    a galley;
    a wing;
    an airplane wing;
    a floor panel; and
    a toilet.

4. The layout apparatus of claim 1, furthermore comprising:
    an energy supply device;
    wherein the energy supply device is adapted for optically supplying energy to the first signal adjustment device.

5. The layout apparatus of claim 1, furthermore comprising an optical separating device and/or an optical combining device;
    wherein the optical separating device is adapted for separating at least two optical signals;
    wherein the optical combining device is adapted for combining optical signals.

6. The layout apparatus of claim 1, wherein the first signal adjustment device is adapted for converting an analogue antenna signal.

7. A radio apparatus comprising:
    a radio system device that divides a total bandwidth of a transmission spectrum of a signal into blocks and provides the blocks to separate layout apparatuses, each of the separate layout apparatuses including:
        a modular layout element for configuring a room;
        a first signal adjustment device in the form of an electronics module for electrical-optical and/or optical-electrical conversion of an antenna signal;
        a radio device connected to the first signal adjustment device;
        a holding device coupled to the modular layout element that holds the first signal adjustment device, the holding device and the radio device integrated into the modular layout element;
    a second signal adjustment device;
    wherein the radio system device is adapted for generating and/or receiving the antenna signal and the radio device is connected to the first signal adjustment device in such a manner that the antenna signal is transmitted and/or received as a radio signal;
    wherein the second signal adjustment device is adapted for electrical-optical and/or optical-electrical conversion of the antenna signal;
    wherein the separate layout apparatuses enable the total bandwidth of the transmission spectrum to be transmitted by a plurality of antennas; and
    wherein the first signal adjustment device is exchangeable for providing different types of wireless functionality.

8. The radio apparatus of claim 7, wherein the radio system device is selected from the group of radio system devices consisting of:
    a mobile radio system device;
    a WLAN radio system device;
    a mobile-radio-interferer radio system device;
    a DVB-T radio system device; and
    a DMB radio system device.

9. A communication system comprising:
    (i) a layout apparatus including:
        a modular layout element;
        a first signal adjustment device in the form of an electronics module;
        a radio device;
        a module carrier holding the first signal adjustment device; and
        a connecting device connected to the module carrier for accommodating an optical conductor so that the optical connector is hidden from view by the modular layout element, the connecting device connecting the first signal adjustment device to the optical conductor;
        wherein the modular layout element is adapted for configuring a room;

wherein the first signal adjustment device is adapted for electrical-optical and/or optical-electrical conversion of an antenna signal;
wherein the module carrier, the radio device and the connecting device are integrated in the modular layout element;
wherein the radio device is connected to the first signal adjustment device in such a manner that the antenna signal can be transmitted and/or received as a radio signal;
wherein the first signal adjustment device is exchangeable for providing different types of wireless functionality; and
(ii) a radio apparatus including:
a radio system device;
a second signal adjustment device;
wherein the radio system device is adapted for generating and/or receiving the antenna signal;
wherein the second signal adjustment device is adapted for electrical-optical and/or optical-electrical conversion of the antenna signal; and
wherein the radio apparatus and the layout apparatus are connected via an on-board optical waveguide system.

10. An airplane comprising:
(i) at least one layout apparatus, the layout apparatus including:
a modular layout element that configures a room;
a first signal adjustment device in the form of an electronics module;
a radio device;
a module carrier holding the first signal adjustment device; and
a connecting device connected to the module carrier that accommodates an optical conductor so that the optical conductor is hidden by the modular layout element from view in the room, the connecting device connecting the first signal adjustment device to the optical conductor;
wherein the first signal adjustment device is adapted for electrical-optical and/or optical-electrical conversion of an antenna signal; and
wherein the module carrier, the radio device and the connecting device are integrated in the modular layout element;
wherein the radio device is connected to the first signal adjustment device in such a manner that the antenna signal can be transmitted and/or received as a radio signal;
wherein the first signal adjustment device is exchangeable for providing different types of wireless functionality; and
(ii) at least one radio apparatus.

* * * * *